(12) United States Patent
Mitchiner et al.

(10) Patent No.: US 10,862,808 B2
(45) Date of Patent: Dec. 8, 2020

(54) BIN PACKING OF FLOWS IN A DYNAMIC BANDWIDTH UNDERLAY

(71) Applicant: Cisco Technology, Inc., San Jose, CA (US)

(72) Inventors: Mark Ross Mitchiner, San Diego, CA (US); Dana Lynn Blair, Alpharetta, GA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 15/916,967

(22) Filed: Mar. 9, 2018

(65) Prior Publication Data

US 2019/0280981 A1  Sep. 12, 2019

(51) Int. Cl.
*H04L 12/851* (2013.01)
*H04W 28/10* (2009.01)
*H04W 28/02* (2009.01)
*H04L 12/927* (2013.01)
*H04L 12/721* (2013.01)

(52) U.S. Cl.
CPC .............. *H04L 47/24* (2013.01); *H04L 45/38* (2013.01); *H04L 47/805* (2013.01); *H04W 28/0268* (2013.01); *H04W 28/10* (2013.01)

(58) Field of Classification Search
CPC ....... H04L 47/24; H04L 47/805; H04L 45/38; H04W 28/10; H04W 28/0268
See application file for complete search history.

(56) References Cited

U.S. PATENT DOCUMENTS

| | | | |
|---|---|---|---|
| 2003/0072318 A1* | 4/2003 | Lam | H04L 45/04 370/428 |
| 2006/0039381 A1* | 2/2006 | Anschutz | H04L 47/805 370/395.21 |
| 2008/0123531 A1* | 5/2008 | Gerkis | H04L 47/6215 370/235 |

* cited by examiner

*Primary Examiner* — Thai Nguyen
(74) *Attorney, Agent, or Firm* — Merchant & Gould P.C.

(57) ABSTRACT

A method including: receiving a flow; for each interface in the plurality of interfaces, determining the preference of the interface for the flow; when only a single interface has a preference for the flow, assigning the flow to that single interface; when multiple interfaces having a preference for the flow have comparable headroom, assigning the flow to the interface of the multiple interfaces with the fewest flows currently assigned to it; and when multiple interfaces having a preference for the flow do not have comparable headroom, assigning the flow to the interface within the multiple interfaces having a preference for the interface that has the greatest headroom.

20 Claims, 19 Drawing Sheets

BIN PACKING OF FLOWS IN A DYNAMIC BANDWIDTH UNDERLAY

TECHNICAL FIELD

This disclosure relates in general to processing of communications signals, and more particularly, to efficient bin packing of flows in a dynamic bandwidth underlay.

BACKGROUND

As the number of connected devices continues to grow at an exponential rate, the need to make use of all available bandwidth of a transport network becomes critical. One example of such the growth of such devices is through the phenomena of the Internet of Things or IOT. The transport network may have multiple ingress and egress interfaces that can reach the same destination. Additionally, the interface bandwidths are variable over time; the traffic matrix is constantly changing; and impairments may come and go. In this highly variable condition, there is a need to maximally utilize the available bandwidth while maintaining reachability and support forwarding preferences on a per-application basis.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

Figure 1:
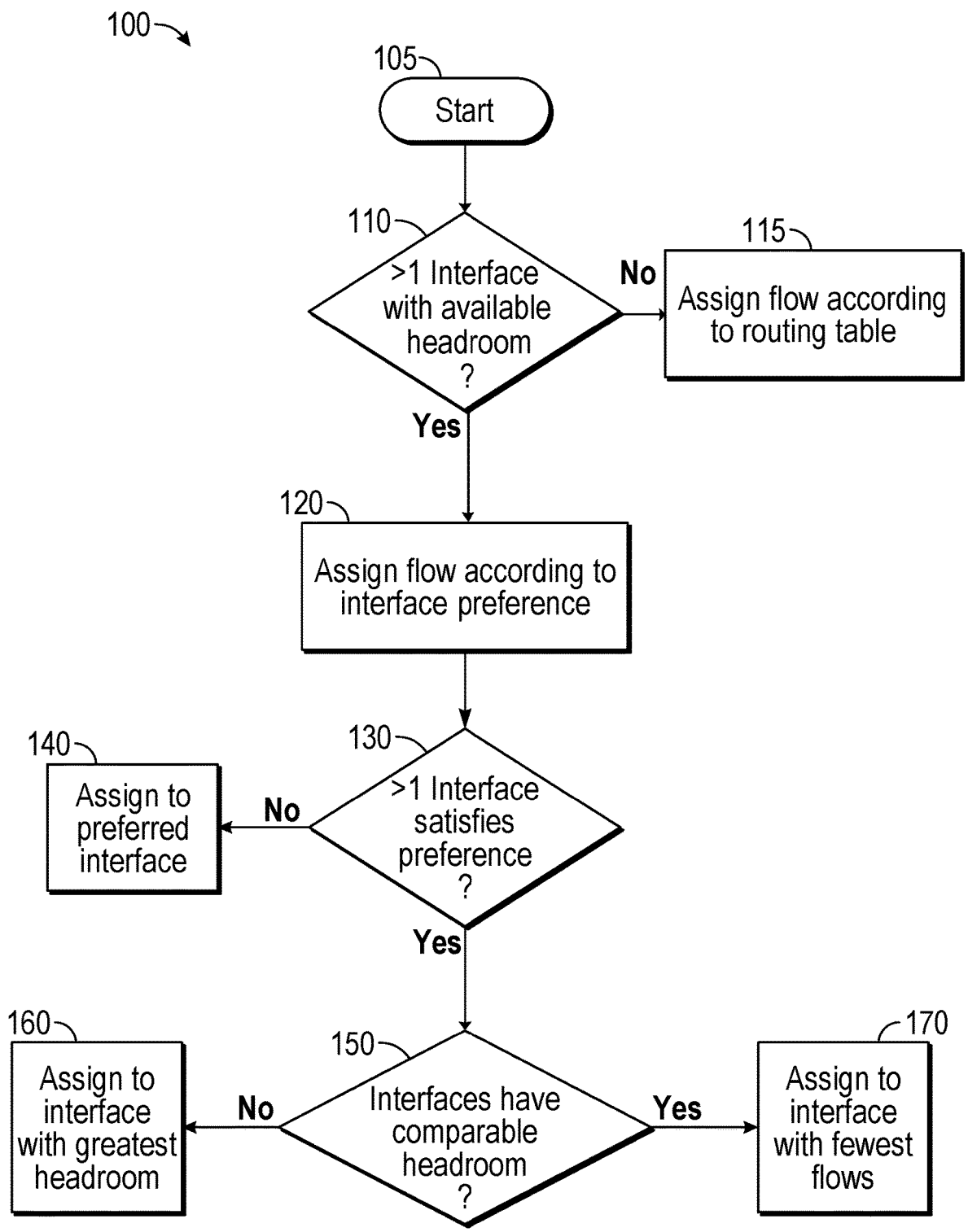
FIG. 1 is a flow chart of a flow distribution process.

Methods and systems are disclosed for enhancing the utilization of interfaces and nexthops that can reach the same destination by moving flows among interfaces to enforce interface preference, enhance headroom, and distribute the flows as widely as possible to achieve business policy, create room for flows to grow, and reduce the impact of a single outage. The methods and systems operate by: detecting changes to both the bandwidth of an interface as well as increases or decreases of a flow's throughput requirements in real time; distributing flows across interfaces on a per-application/identity basis, allowing each interface to have per-application preference; redistributing flows to interfaces as the bandwidth on those interfaces change; and enhancing the available bandwidth across multiple, dynamic interfaces on a per-application basis.

This is accomplished through the use of a process that first assigns flows according to the preference of each interface. Each interface has a value representing the preference of the interface for a Differentiated Services Code Point ("DSCP") value, and these values for each interface are typically stored in a matrix. If only one interface satisfies the preference, the flow is assigned to that interface. If more than one interface satisfies the preference, a check is made to see if the interfaces have comparable headroom. If the interfaces have comparable headroom, the flow is assigned to the interface with the fewest flows. If the interfaces do not have comparable headroom, the flow is assigned to the interface with the greatest headroom. The above process is known as the "flow distribution process."

Flows may be packed based on three variables: the source IP address; the destination IP address; and the DSCP value (used in QoS provisioning). Many flows may be packed into a single flow within the boundaries of the variable bandwidth. Flows typically have a variable bandwidth and the number of flows packed within a flow may change with time. The interface bandwidth and QoS policies limits the bandwidth based on DSCP values. In addition, some flows may be very large flows, so called "elephant flows," and there may also be a very large number of smaller, or "mice," flows. In addition to flows coming and going and changing bandwidth, interfaces may come and go. In the context of the present disclosure, interfaces may be physical interfaces or logical/virtual interfaces for example. Any given site or location may have multiple devices, each with their own set of interfaces. Accordingly, embodiments of the disclosure may be directed to rerouting of flows across a Wide Area Network (WAN)/egress set of interfaces that may also include, for example, load distribution across the set of WAN interfaces or route to another router across a Local Area Network (LAN).

After a holddown period for each flow, checks and adjustments are made for the following conditions: a negative headroom appearing; neighbors going up and neighbors going down; an increase or a decrease in interface bandwidth; and an increase or a decrease in flow bandwidth. If headroom becomes negative, a period of time is waited for Quality of Service ("QoS") to reduce throughput of elastic throws and then revisiting the flow distribution process. If a neighbor goes up, the flow distribution process is run again. If a neighbor goes down, the flows are distributed to the other available interfaces. If the interface bandwidth increases, the flows are spread to minimize the differences in the number of flows among the interfaces. If the interface bandwidth decreases, flows are swapped to minimize the differences in headroom on each interface. If flow bandwidth decreases, flows may be distributed to this interface. If a flow bandwidth increases, the flow may be distributed to another interface or swapped with another flow.

A method of assigning a flow to one of a plurality of interfaces is provided. The method includes: receiving the flow; for each interface in the plurality of interfaces, determining the preference of the interface for the flow; when only a single interface has a preference for the flow, assigning the flow to that single interface; when multiple interfaces having a preference for the flow have comparable headroom, assigning the flow to the interface of the multiple interfaces with the fewest flows currently assigned to it; and when multiple interfaces having a preference for the flow do not have comparable headroom, assigning the flow to the interface within the multiple interfaces having a preference for the interface that has the greatest headroom.

An apparatus is provided. The apparatus includes: a memory; and one or more processors coupled to the memory and configured to execute instructions stored in the memory. The instructions include: receiving the flow; for each interface in the plurality of interfaces, determining the preference of the interface for the flow; when only a single interface has a preference for the flow, assigning the flow to that single interface; when multiple interfaces having a preference for the flow have comparable headroom, assigning the flow to the interface of the multiple interfaces with the fewest flows currently assigned to it; and when multiple interfaces having a preference for the flow do not have comparable headroom, assigning the flow to the interface within the multiple interfaces having a preference for the interface that has the greatest headroom.

A method of assigning a flow to one of a plurality of interfaces is provided. The method includes assigning the flow to an interface in the plurality of interfaces based on the size of the flow and the DSCP value of the flow, the DSCP preference of the interface, the available headroom of the interface, and the number of flows in the interface.

Example Embodiments

FIG. 1 is a flow chart of a flow distribution process 100. This flow distribution process 100 is executed when a new flow is encountered. The flow may be a single flow or a plurality of flows packed together into a single flow. After the process starts (stage 105), it may be determined if there is more than one interface with available headroom (stage 110). If there is not more than one interface with available headroom, then the flow may be assigned to an interface according to a routing table (stage 115). However, if there is more than one interface with available headroom, the DSCP value of the flow is examined, and the interfaces are examined to determine which interfaces have the greatest preference for the flow's DSCP value (stage 120) (known as "qualifying interfaces"). If only a single interface has the greatest preference for the flow's DSCP value (stage 130), i.e. one qualifying interface, the flow is assigned to that interface (stage 140). However, if multiple interfaces have an equally high preference for the flow's DSCP value, the headroom of those qualifying interfaces are checked to see if they have comparable headroom (stage 150). The headroom of an interface is its available bandwidth less the bandwidth of flows currently flowing through that interface. Comparable headroom does not mean precisely equal headroom, but headroom within about 15% of each other, for example. Notwithstanding, other values may be used to determine comparable headroom.

If the qualifying interfaces do not have comparable headroom, the flow is assigned to the qualifying interface with the greatest headroom (stage 160). If the qualifying interfaces have comparable headroom, the flow is assigned to the qualifying interface with the fewest number of flows. Through this process, the flows are dispersed across multiple interfaces to enhance the available bandwidth across multiple, dynamic interfaces on a per-application basis.

Embodiments of the disclosure may also include a case where a flow may be assigned to an interface(s), but there may be no headroom (i.e., all the links may be full or near full). However, the flow may be placed on some interface (i.e., the flow may not be dropped). Accordingly, this flow may be routed via the routing table consistent with embodiments of the disclosure.

Figure 2:
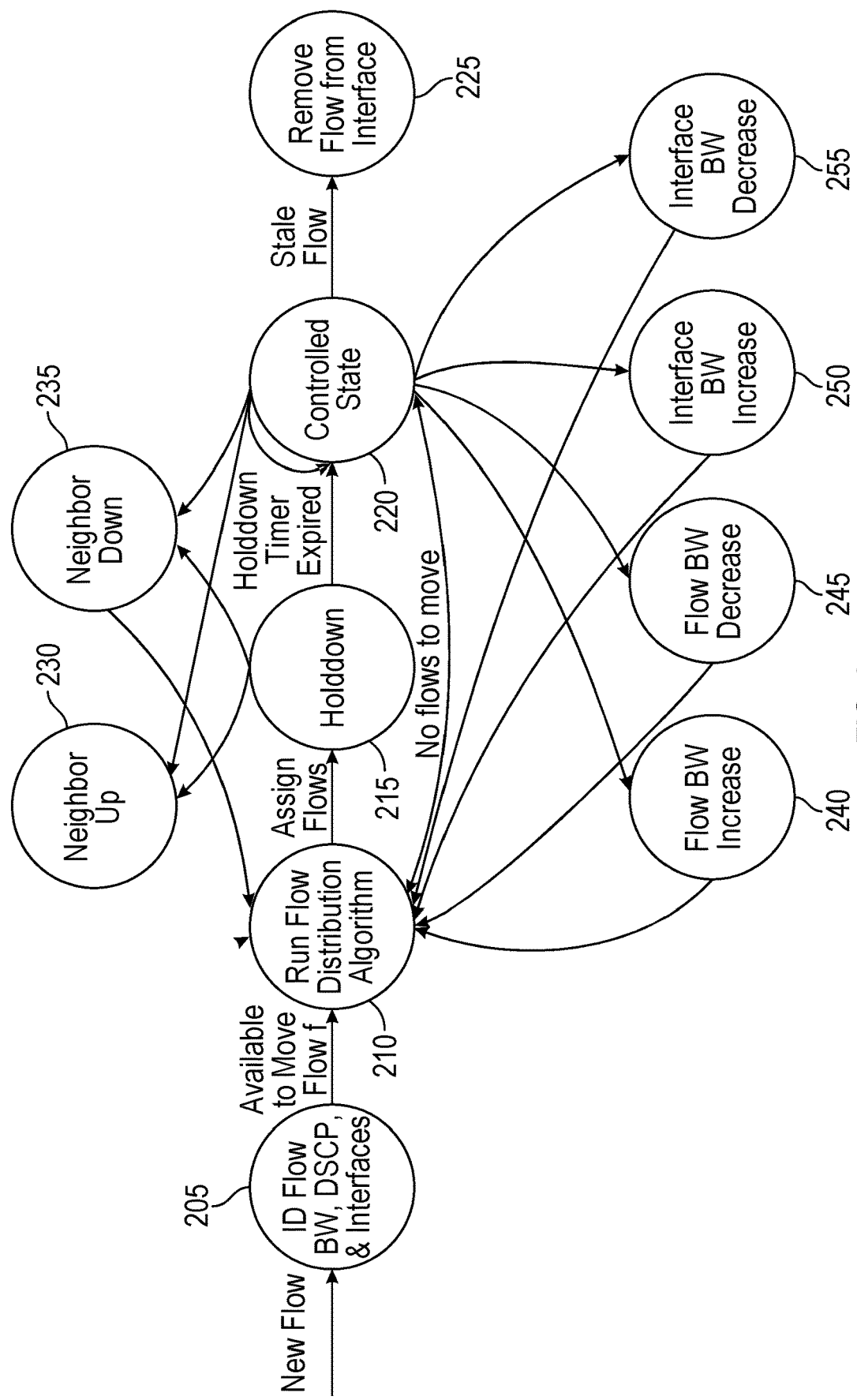
FIG. 2 is a state diagram illustrating the process of assigning flows and handling events.

FIG. 2 is a state diagram illustrating the process of assigning flows and handling events. Starting from left to right, when a new flow enters the system, the flow is identified (205). Specifically, the bandwidth and DSCP value of the flow is determined, as well as an examination of the available interfaces. If the flow is available to move, the flow distribution process (detailed above and with respect to FIG. 1) is executed (210). After the flow distribution process is run, the flow is assigned to an interface and is held at that interface for a holddown period (215). The holddown period is intended to reduce churn. At times, there may be no flows to move, in which case the state moves from the flow distribution process state 210 directly to the controlled state 220. After expiry of the holddown period, the system maintains itself in a controlled, stable state (220) until certain events occur or the flow turns stale. If the flow turns stale, the flow is removed from the interface (225).

If a neighbor goes up (230) or a neighbor goes down (235), i.e. an interface appears or disappears, from either the holddown state (215) or the controlled state (220), then the flow distribution process will be reexecuted so that flows can be moved or swapped. In this way, a neighbor going down will not have a situation where flows on the neighbor are abandoned, and if a neighbor comes up, the system can take advantage of the presence of the new interface.

If the flow bandwidth increases (240), the flow bandwidth decreases (245), the interface bandwidth increases (250), or the interface bandwidth decreases (255), the flow distribution process is run again (210) to redistribute the flows, allowing flows to possibly be moved or swapped.

Figure 3:
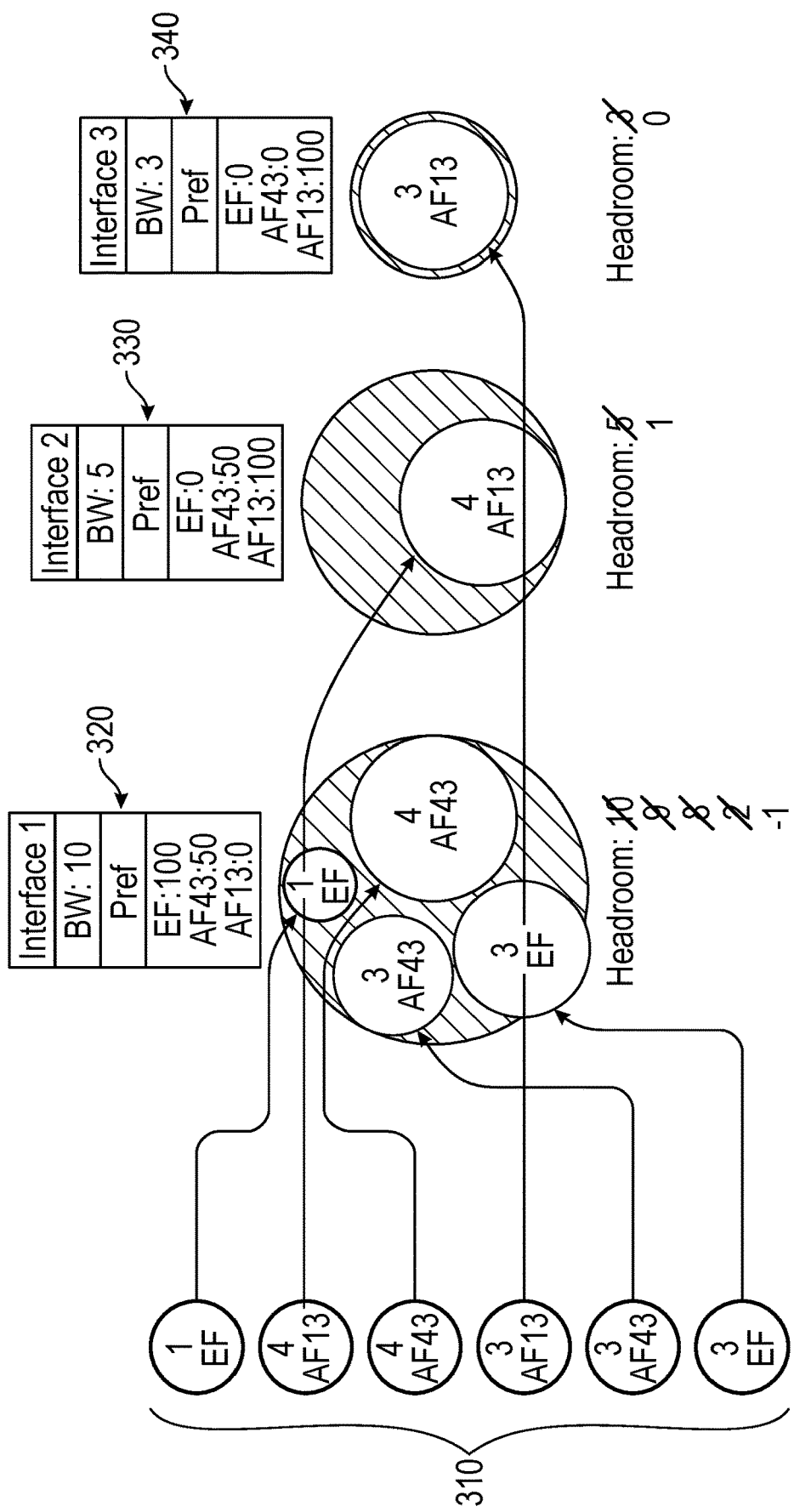
FIG. 3 is an illustration of the operation of the flow distribution process.

FIG. 3 is an illustration of the operation of the flow distribution process 100. Flows 310 are new flows that need to be assigned to interfaces 320, 330, or 340. Stepping through each flow helps to illustrate the operation of the flow distribution process 100. For purposes of describing this illustration, each flow is identified by the size of the flow and the DSCP value of the flow. First flow 1EF (size of 1 with a DSCP value of EF) needs to be distributed to one of the interfaces 320, 330, or 340. Interface 1 320 has an interface preference for EF of 100, which is far larger than the interface preferences of zero for Interface 2 330 and Interface 3 340. As there is only a single interface that has a preference for EF, flow 1EF is assigned to Interface 1 310, and Interface 1 310's headroom is decreased from 10 to 9.

Second flow 4AF13 (size of 4 with a DSCP value of AF13) next needs to be distributed. For this flow two interfaces, Interface 2 330 and Interface 3 340 have a preference of 100 for AF13. A check is next made to see if they have comparable headroom. Interface 2 330 has a headroom of 5; Interface 3 340 has a headroom of 3. It, therefore, is assigned to Interface 2 330 with the greatest headroom. Interface 2 330's headroom decreases from 5 to 1.

Third flow 4AF43 (size of 4 with a DSCP value of AF43) needs to be distributed. Both Interface 1 320 and Interface 2 330 have a preference for AF43 of 50, so more than a single interface satisfies the preference. Interface 1 320 has a current headroom of 9, while Interface 2 330 has a headroom of only 1. Therefore, flow 4AF43 is assigned to Interface 1 320. The headroom of Interface 1 320 decreases from 9 to 5.

Fourth flow 3AF13 (size of 3 with a DSCP value of AF13) needs to be distributed. For this flow two interfaces, Interface 2 330 and Interface 3 340 have a preference of 100 for AF13. A check is next made to see if they have comparable headroom. Interface 2 330 has a headroom of 1; Interface 3 340 has a headroom of 3. It, therefore, is assigned to Interface 3 340 with the greatest headroom. Interface 3 340's headroom decreases from 3 to 0.

Fifth flow 3AF43 (size of 3 with a DSCP value of AF43) needs to be distributed. Both Interface 1 320 and Interface 2 330 have a preference for AF43 of 50, so more than a single interface satisfies the preference. Interface 1 320 has a current headroom of 5, while Interface 2 330 has a headroom of only 1. Therefore, flow 3AF43 is assigned to Interface 1 320. The headroom of Interface 1 320 decreases from 5 to 2.

Sixth flow 3EF (size of 3 with a DSCP value of EF) needs to be distributed. Interface 1 320 has an interface preference for EF of 100, which is far larger than the interface preferences of zero for Interface 2 330 and Interface 3 340. As there is only a single interface that has a preference for EF, flow 3EF is assigned to Interface 1 310, and Interface 1 310's headroom is decreased from 2 to −1.

Figure 4A:
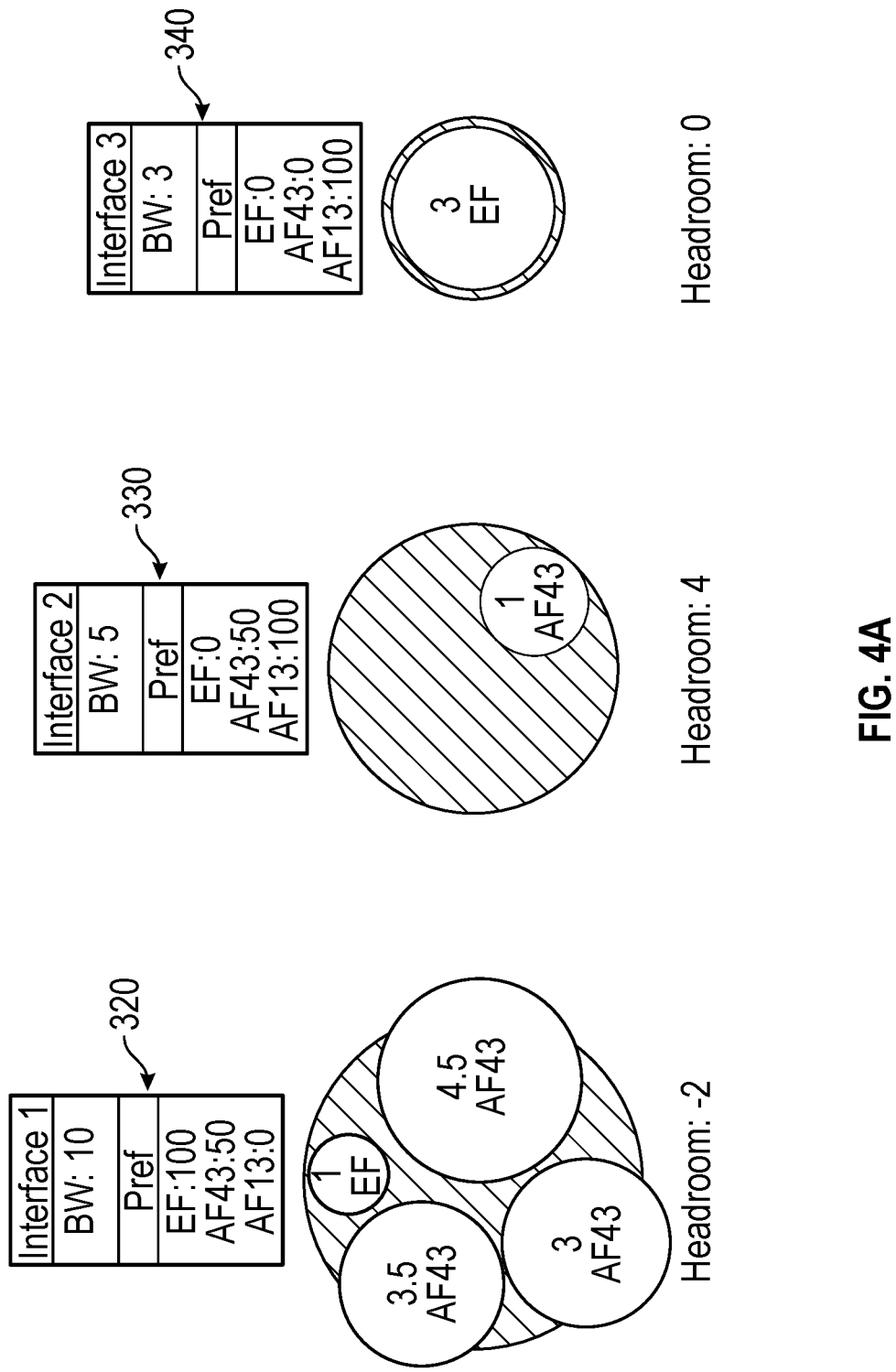
FIGS. 4a-c illustrate the operation of a flow redistribution process that operates when a negative headroom event occurs.
Figure 4B:
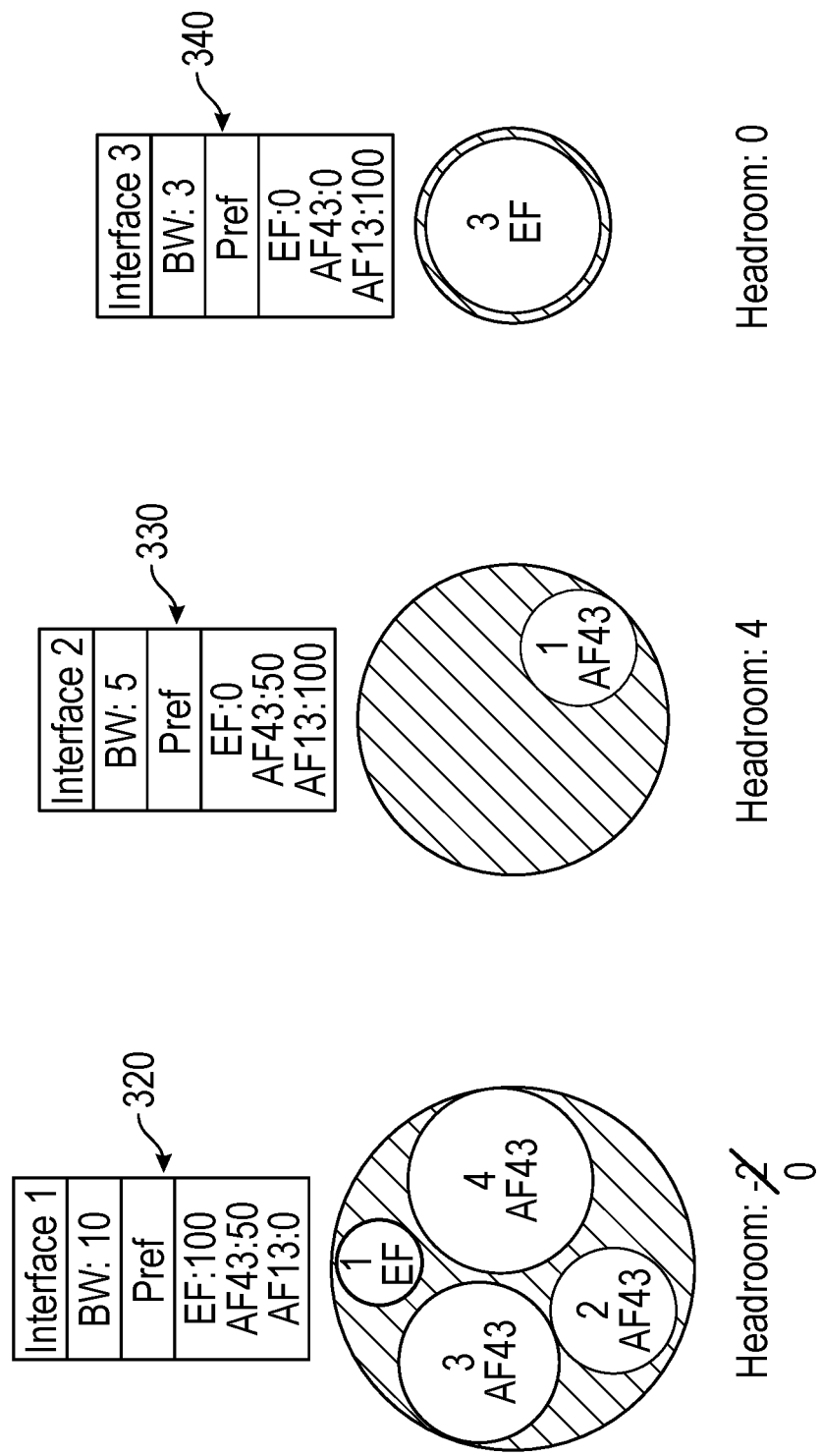
Figure 4C:
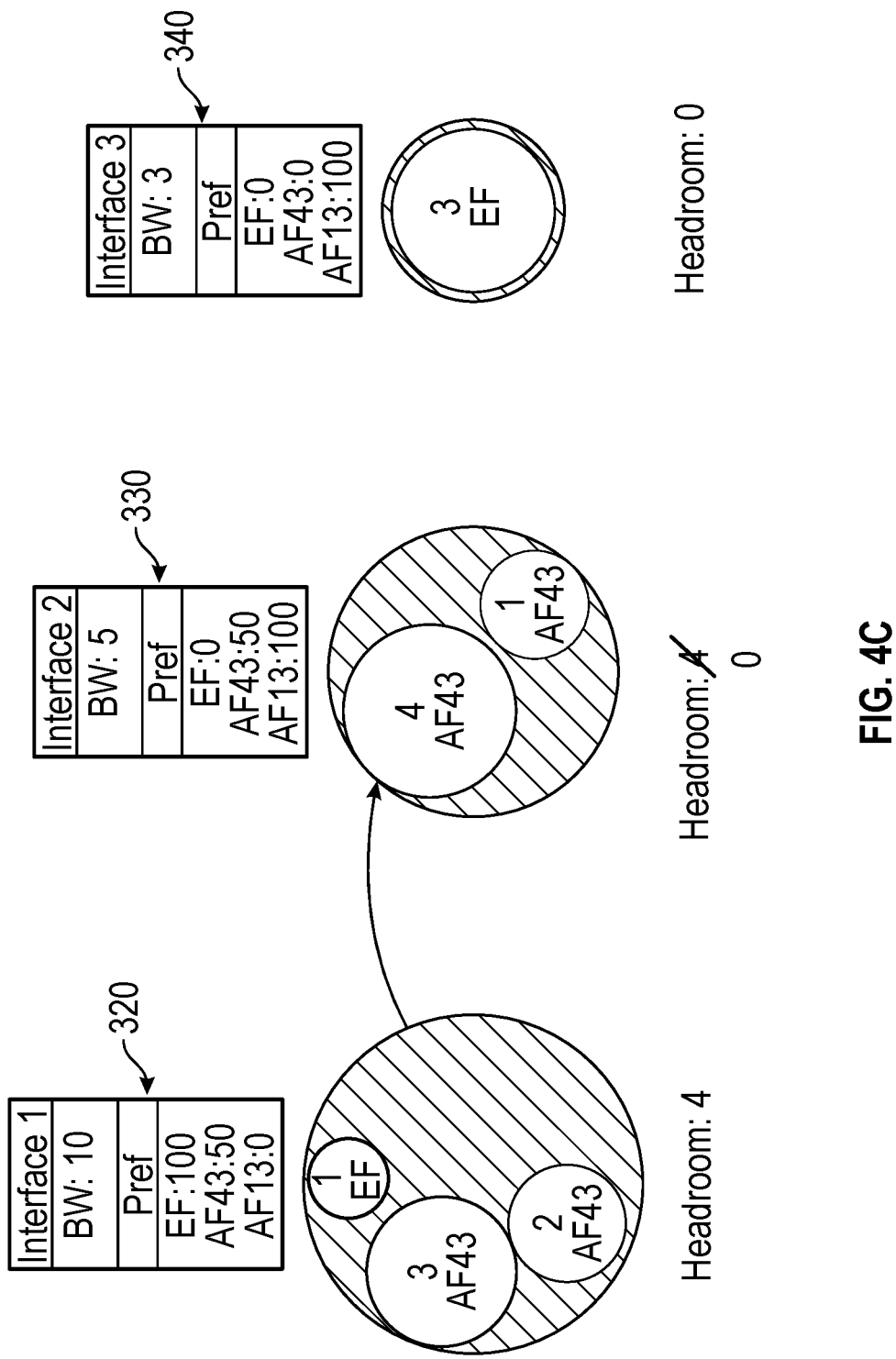

FIGS. 4*a*-*c* illustrate the operation of a flow redistribution process that operates when a negative headroom event occurs. In FIG. 4*a*, flows in Interface 1 have grown in size, such that the headroom of Interface 1 320 is −2. In FIG. 4*b*, QoS has activated to bring down the size of flows 3AF43, 4AF43, and 2AF43 from previous values of 3.5, 4.5, and 3, respectively. The flow redistribution process now attempts to redistribute the flows to minimize headroom differences and differences in numbers of flows between interfaces. As Interface 2 330 also has a preference for DSCP value AF43, flow 4AF43 is chosen, as shown in FIG. 4*c*, to be moved to Interface 2 330. This puts two flows in Interface 2 330 and three flows in Interface 1 320. The headroom of Interface 1 320 is increased to 4; the headroom of Interface 2 330 is decreased to zero.

Figure 5:
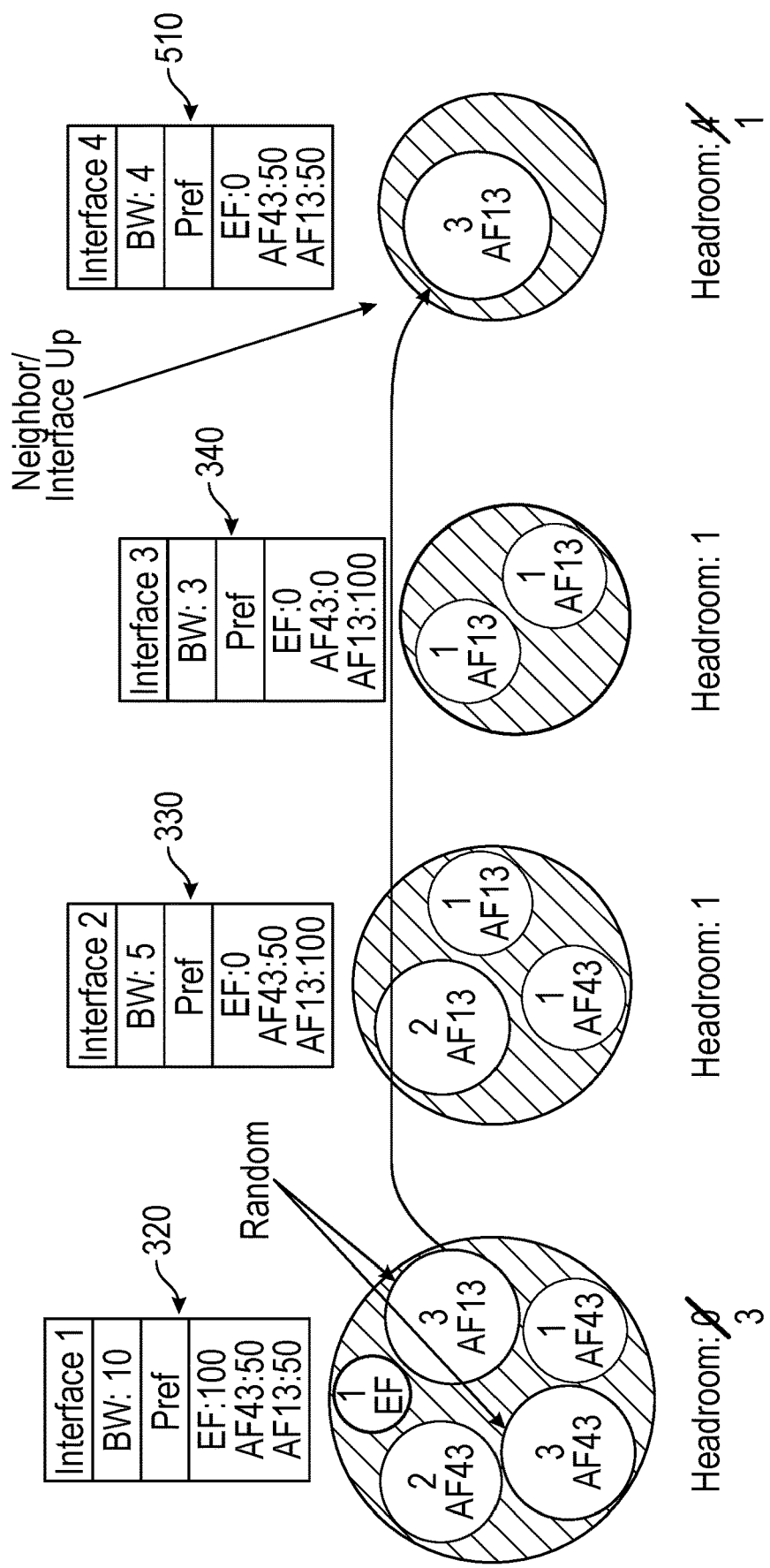
FIG. 5 is an illustration of the operation of a flow redistribution process that operates when a neighbor up event occurs.

FIG. 5 is an illustration of the operation of a flow redistribution process that operates when a neighbor up event occurs. In this illustration a new interface, Interface 4 510 comes up. When Interface 4 510 appears, the flow redistribution process will search for the largest flow with the highest per-DSCP preference that minimizes the difference in headroom. Searching through the flows in Interfaces 320, 330, and 340 yields two flows that meet this criteria, flow 3AF13 and flow 3AF43, which both are currently in Interface 1 320. Moving either flow will increase the headroom in Interface 1 320 to 3 and decrease the headroom in new Interface 4 510 to 1. As moving either flow yields the same result, one of them is randomly selected. In this example, flow 3AF13 is moved from Interface 1 320 to Interface 4 510.

Figure 6A:
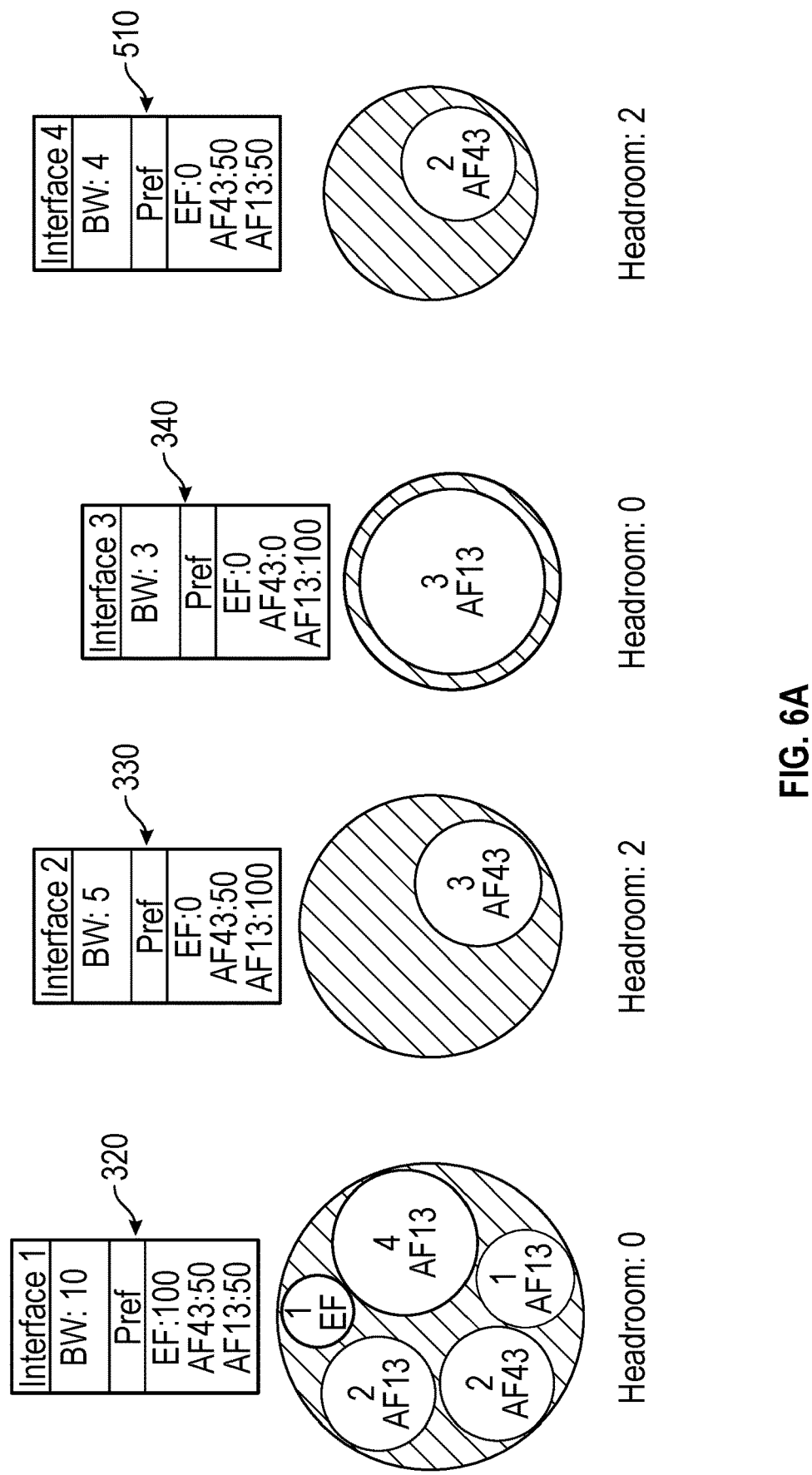
FIGS. 6a-b illustrate of the operation of the flow distribution process operating when a neighbor down event occurs.
Figure 6B:
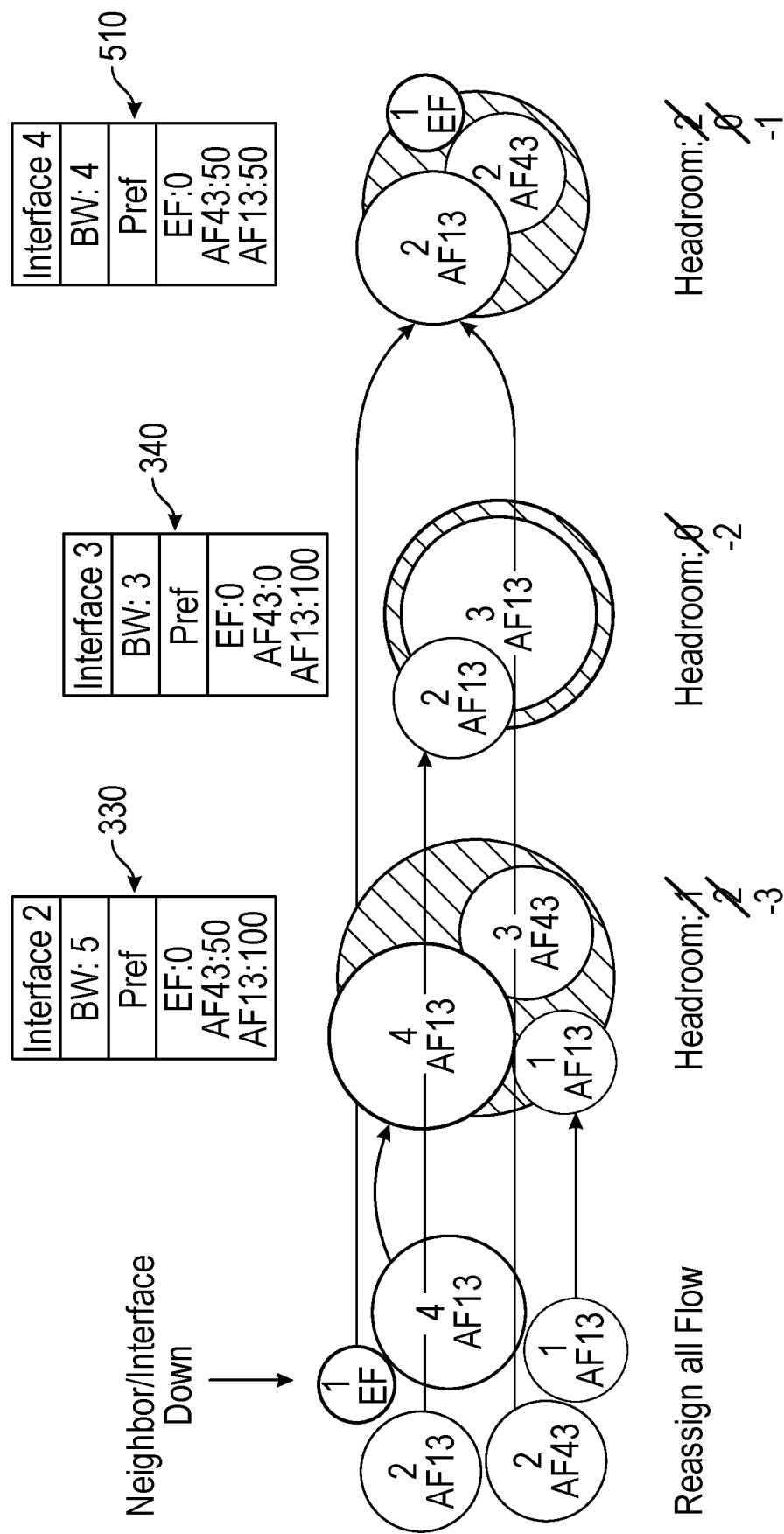

FIGS. 6*a*-*b* illustrate of the operation of the flow distribution process operating when a neighbor down event occurs. FIG. 6*a* illustrates the status of the system prior to Interface 1 320 going down. If Interface 1 320 were to go down, then all of the flows assigned to Interface 1 320 would have to be reassigned to other interfaces. The flows may be reassigned in any random order. Reassignment of flows is shown in FIG. 6*b*. For each flow, the process searches through all interfaces to determine the interface that has: the highest per-DSCP preference; the largest headroom; and the least number of flows. Flow 4AF13 is assigned to Interface 2 330 because it is the interface that has the largest headroom among the two interfaces, Interface 2 330 and Interface 3 340, that have a preference of 100 for AF13. The headroom of Interface 2 340 is then reduced from 2 to −2.

Flow 2AF43 is assigned to Interface 4 510 because it has the largest headroom of the interfaces, Interface 4 510 and Interface 2 330, that have a preference of 50 for AF43. The headroom of Interface 4 510 decreases from 2 to 0. Flow 2AF13 is assigned to Interface 3 340 because it is the interface with the largest available headroom of the interfaces that have a preference for AF13, Interface 2 330 and Interface 3 340. The headroom of Interface 3 340 is then reduced from 0 to −2.

Flow 1EF is assigned to Interface 4 510 because all of the interfaces have an equal preference of zero for flow EF and Interface 4 510 has the greatest headroom, zero compared to negative two. The headroom of Interface 4 510 is reduced to −1. Flow 1AF13 is assigned to Interface 2 330. Both Interface 2 330 and Interface 3 340 have a preference of 100 for AF13; have a headroom of −2, and have two flows, so it could be assigned to either interface with one chosen randomly. The headroom of Interface 2 330 is reduced from −2 to −3.

As the headroom of all of the interfaces is negative, QoS will operate to shrink the flows to fit in the bandwidth allotted for those DSCP values.

Figure 7A:
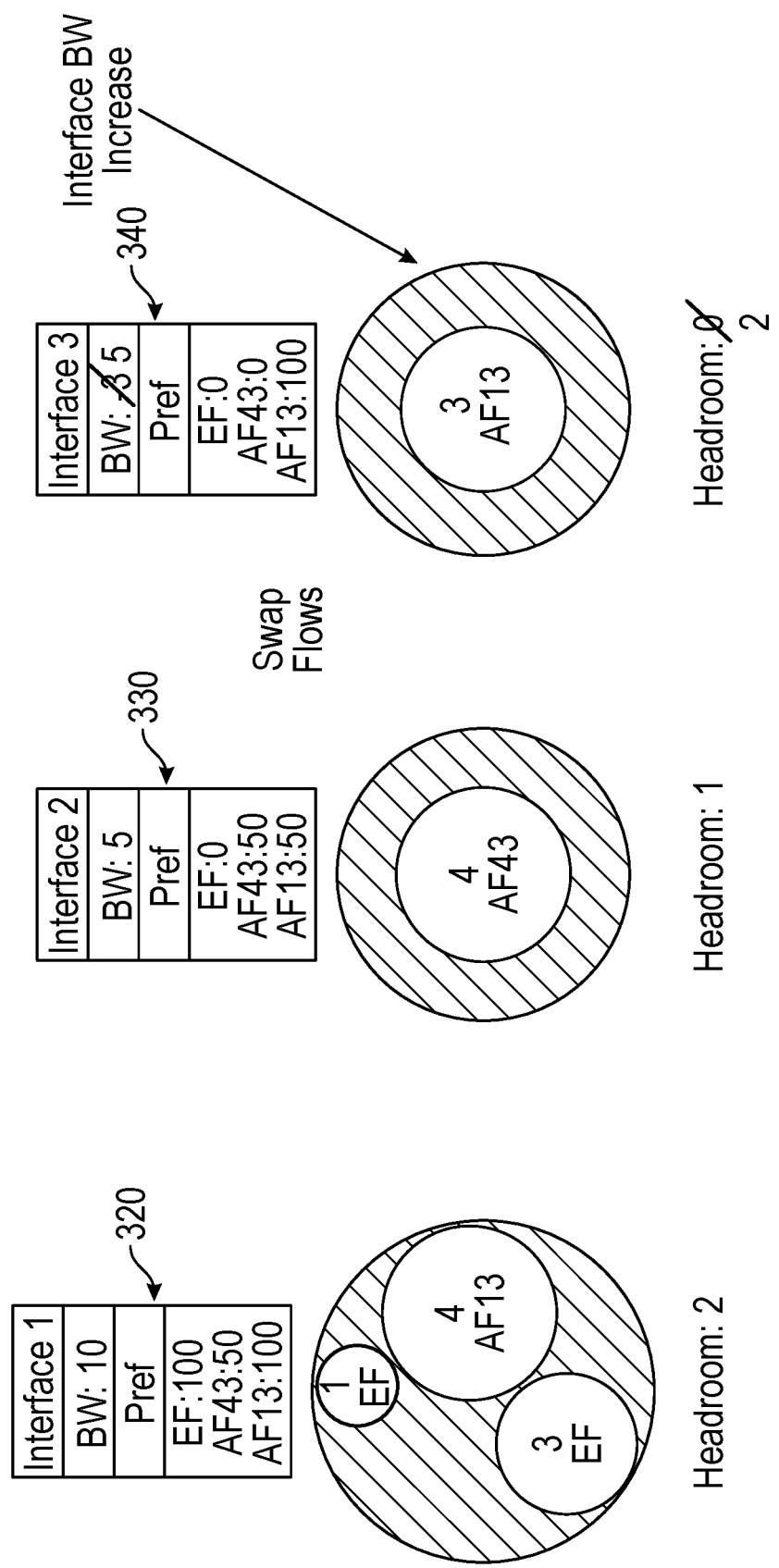
FIGS. 7a-b illustrate the operation of a flow redistribution process that operates when an interface bandwidth increase event occurs.
Figure 7B:
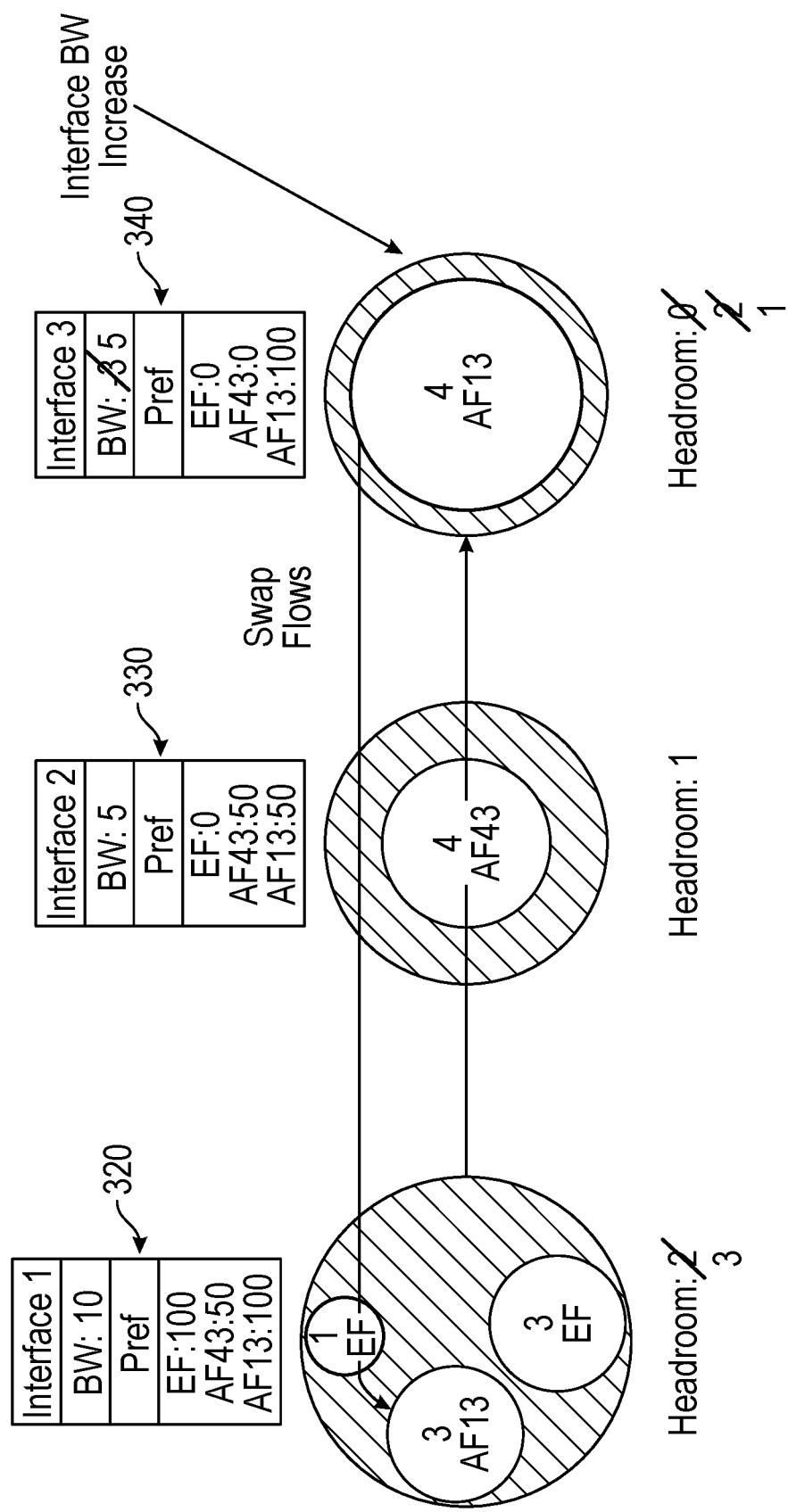

FIGS. 7*a*-*b* illustrate the operation of a flow redistribution process that operates when an interface bandwidth increase event occurs. In FIG. 7*a*, the bandwidth of Interface 3 340 increases from 3 to 5. The headroom, therefore, changes from 0 to 2. In FIG. 7*b*, the process swaps the flow 3AF13 in Interface 3 340 with flow 4AF13 in Interface 1 320. The headroom of Interface 1 320 increases from 2 to 3; the headroom of Interface 3 340 decreases from 2 to 1.

Figure 8:
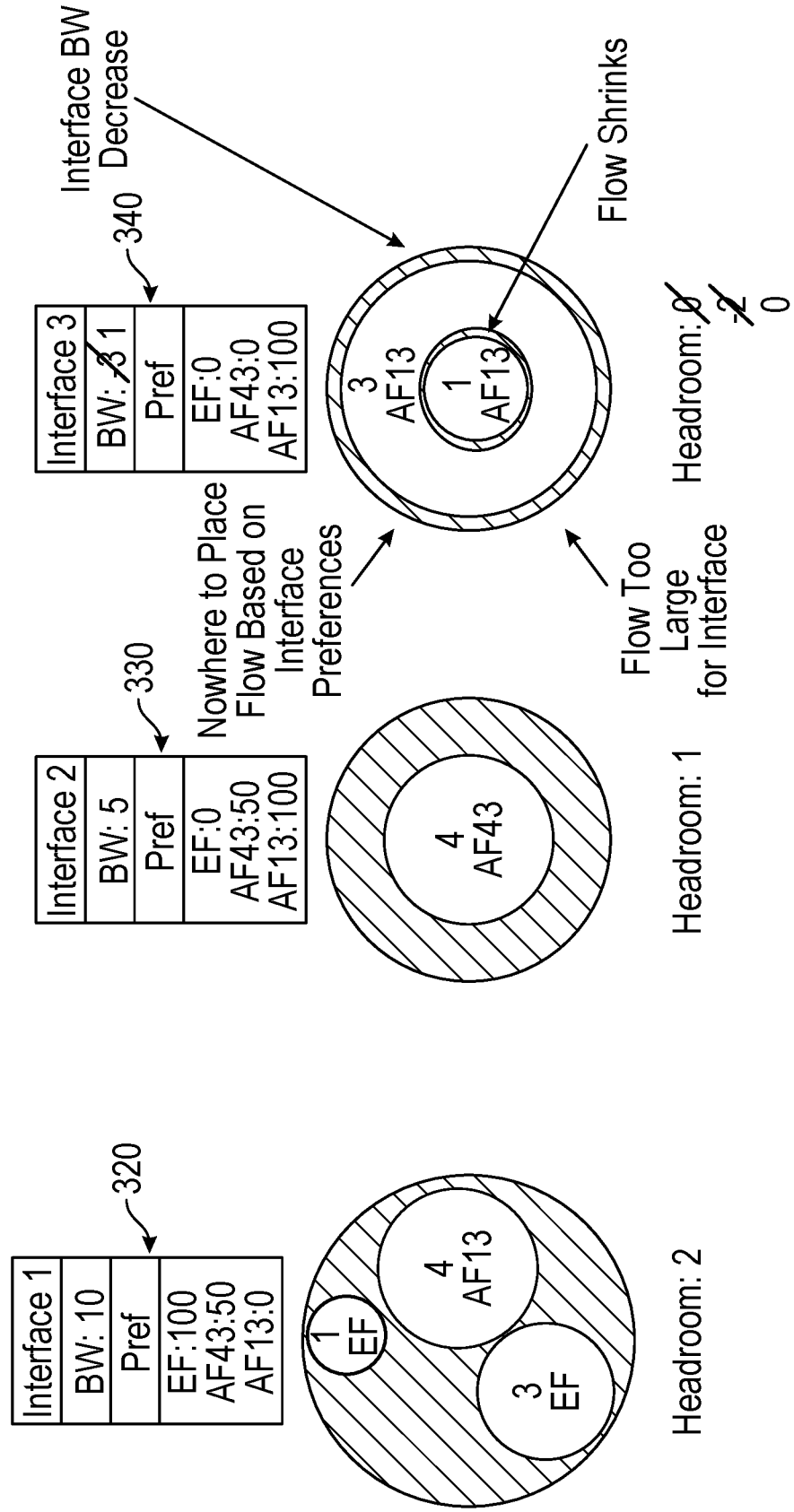
FIG. 8 is an illustration of the operation of a flow redistribution process that operates when an interface bandwidth decrease event occurs.

FIG. 8 is an illustration of the operation of a flow redistribution process that operates when an interface bandwidth decrease event occurs. Interface 3 340 has an initial bandwidth of 3, but it gets reduced to 1. Flow 3AF13 is not too large for the interface, as the headroom is reduced to −2. Based on interface preferences there is no place to place the flow. Therefore, QoS will shrink the flow to a size of 1, and the headroom will go to 0.

Figure 9:
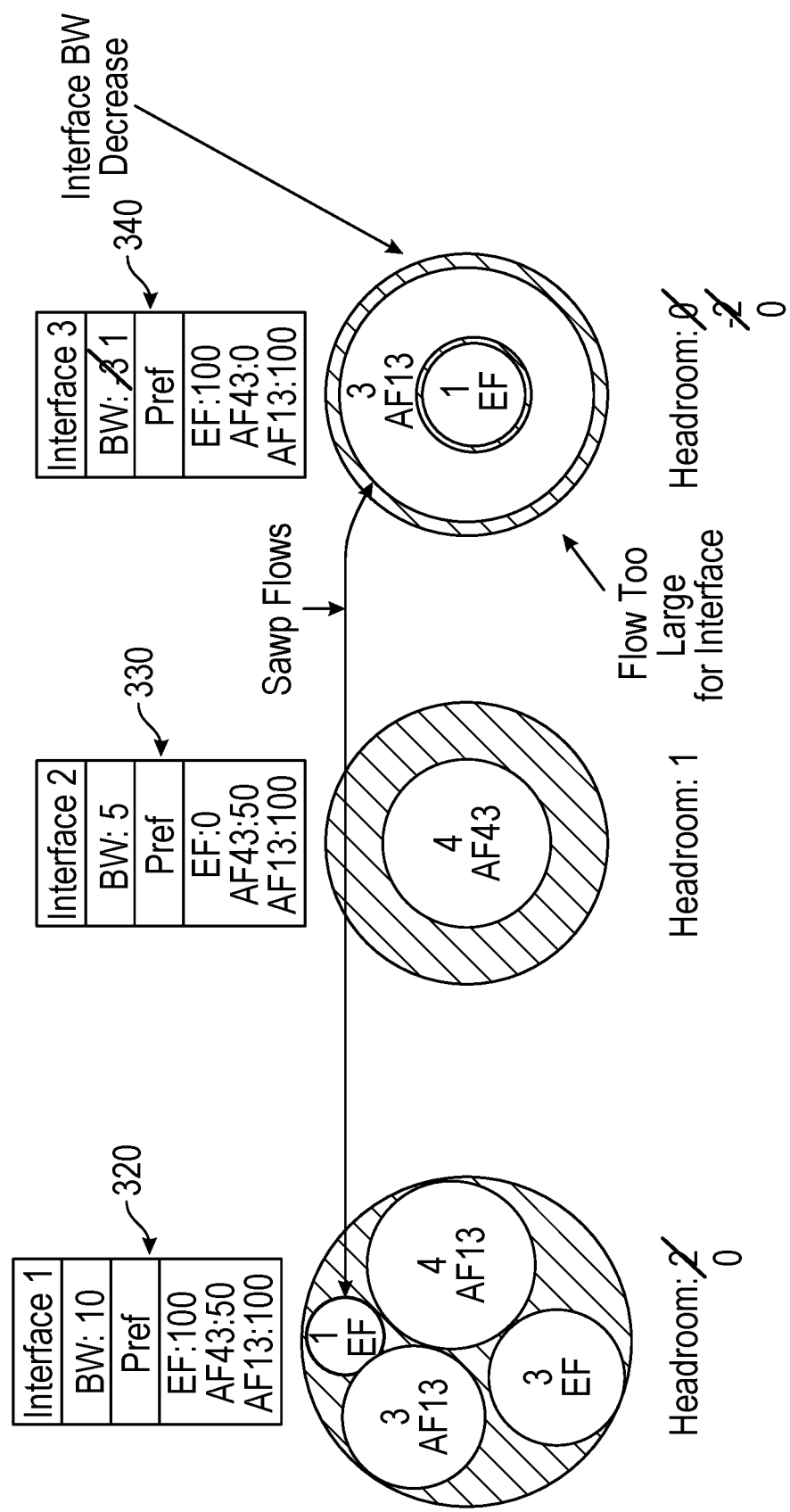
FIG. 9 is another illustration of the operation of a flow redistribution process that operates when an interface bandwidth decrease event occurs.

FIG. 9 is another illustration of the operation of a flow redistribution process that operates when an interface bandwidth decrease event occurs. Interface 3 340 has an initial bandwidth of 3, but it gets reduced to 1. Flow 3AF13 is not too large for the interface, as the headroom is reduced to −2. The process may now swap flow 1EF in Interface 1 320 with flow 3AF13 in Interface 3 340. The headroom of both interfaces is reduced to 0, and no shrinking of flows is required.

Figure 10A:
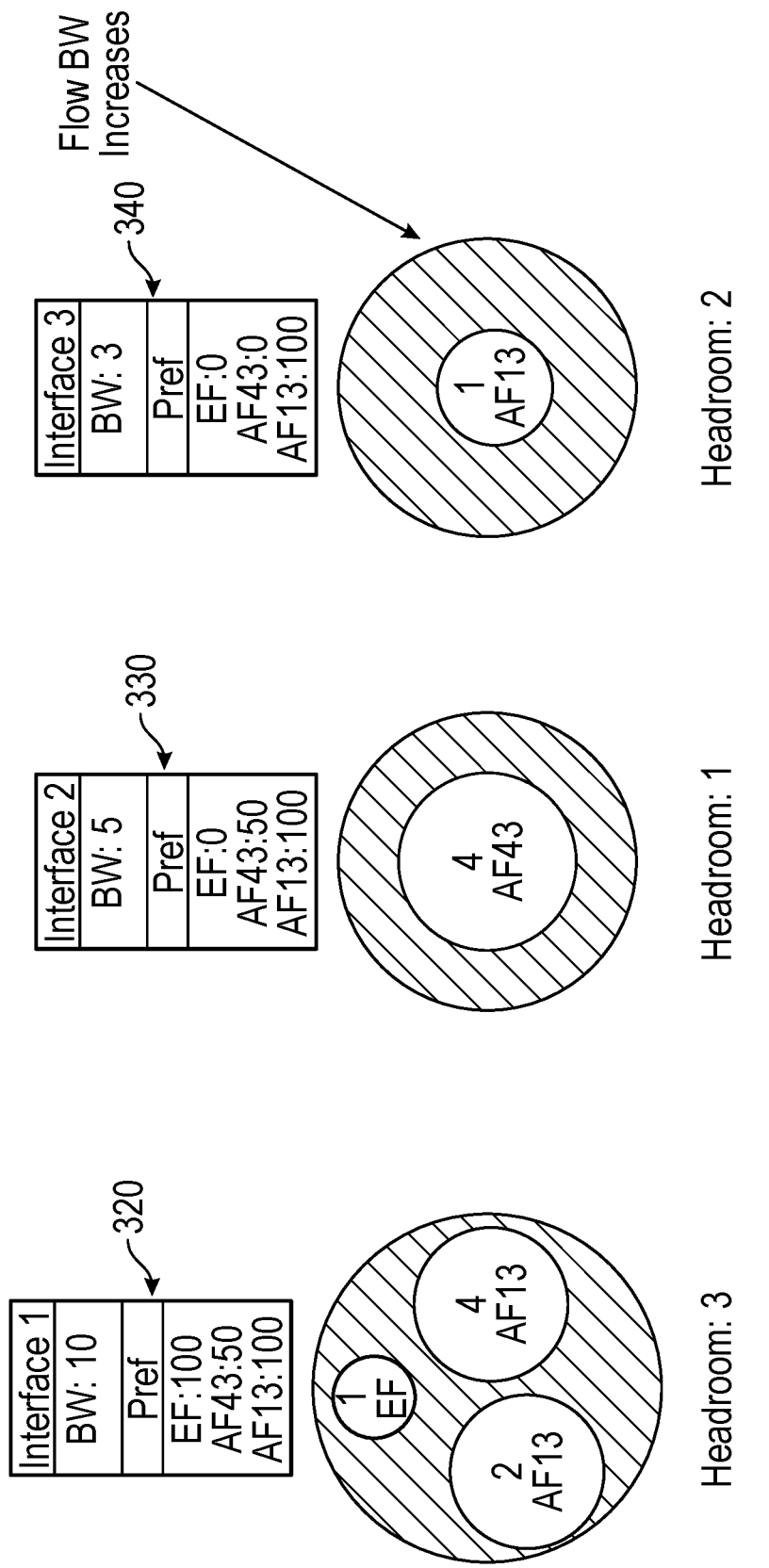
FIGS. 10a-c is an illustration of the operation of a flow redistribution process that operates when a flow bandwidth increase event occurs.
Figure 10B:
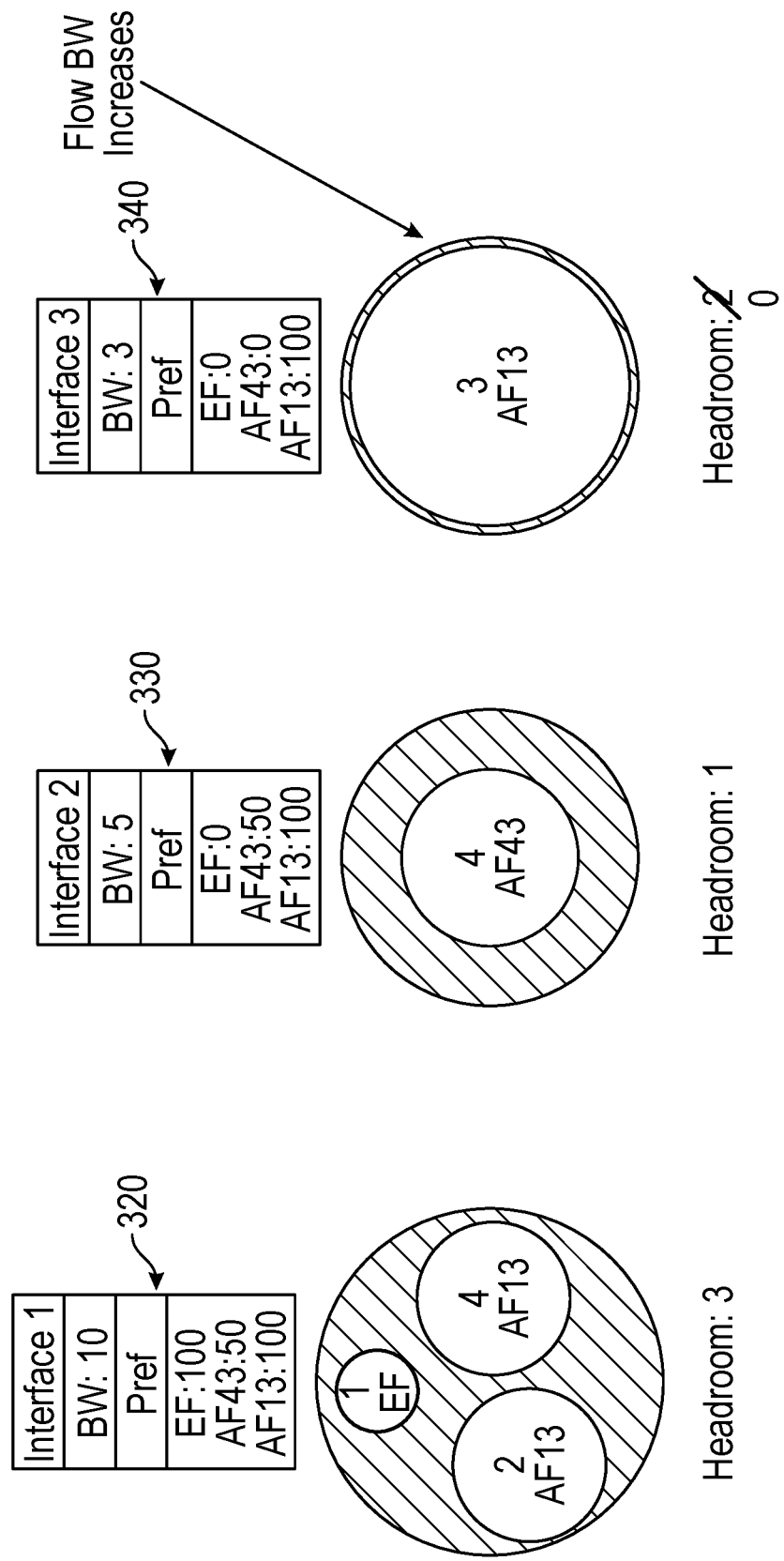
Figure 10C:
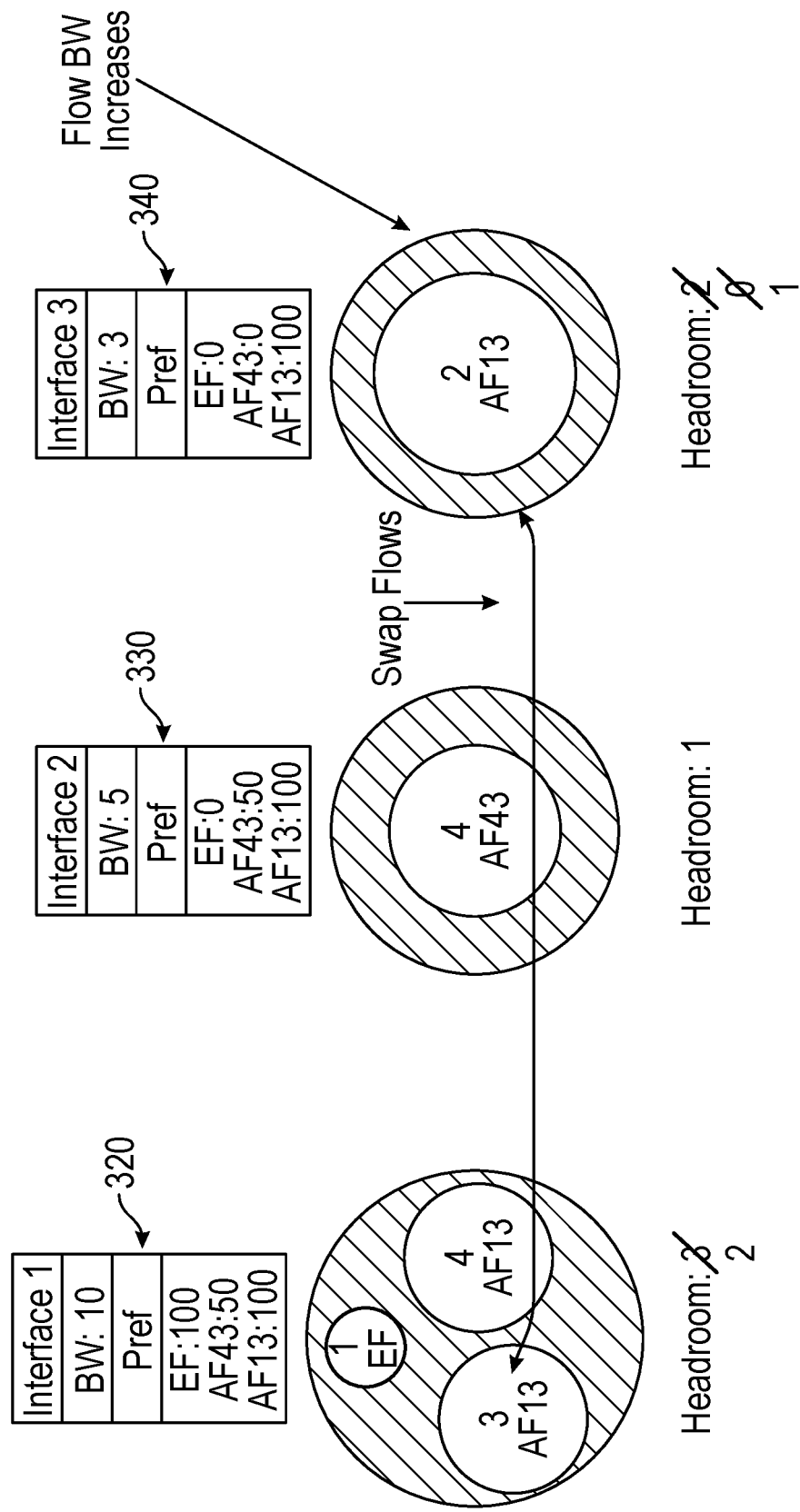

FIGS. 10*a*-*c* is an illustration of the operation of a flow redistribution process that operates when a flow bandwidth increase event occurs. In FIG. 10*a*, the flow bandwidth of the flow in Interface 3 340 is 1 (flow 1AF13). In FIG. 10*b*, that flow increases to become 3AF13, and the headroom is reduced from 2 to 0. In FIG. 10*c*, flow 3 AF13 in Interface 3 340 is swapped with flow 2 AF13 in Interface 1 320 to even out the headroom between interfaces.

Figure 11A:
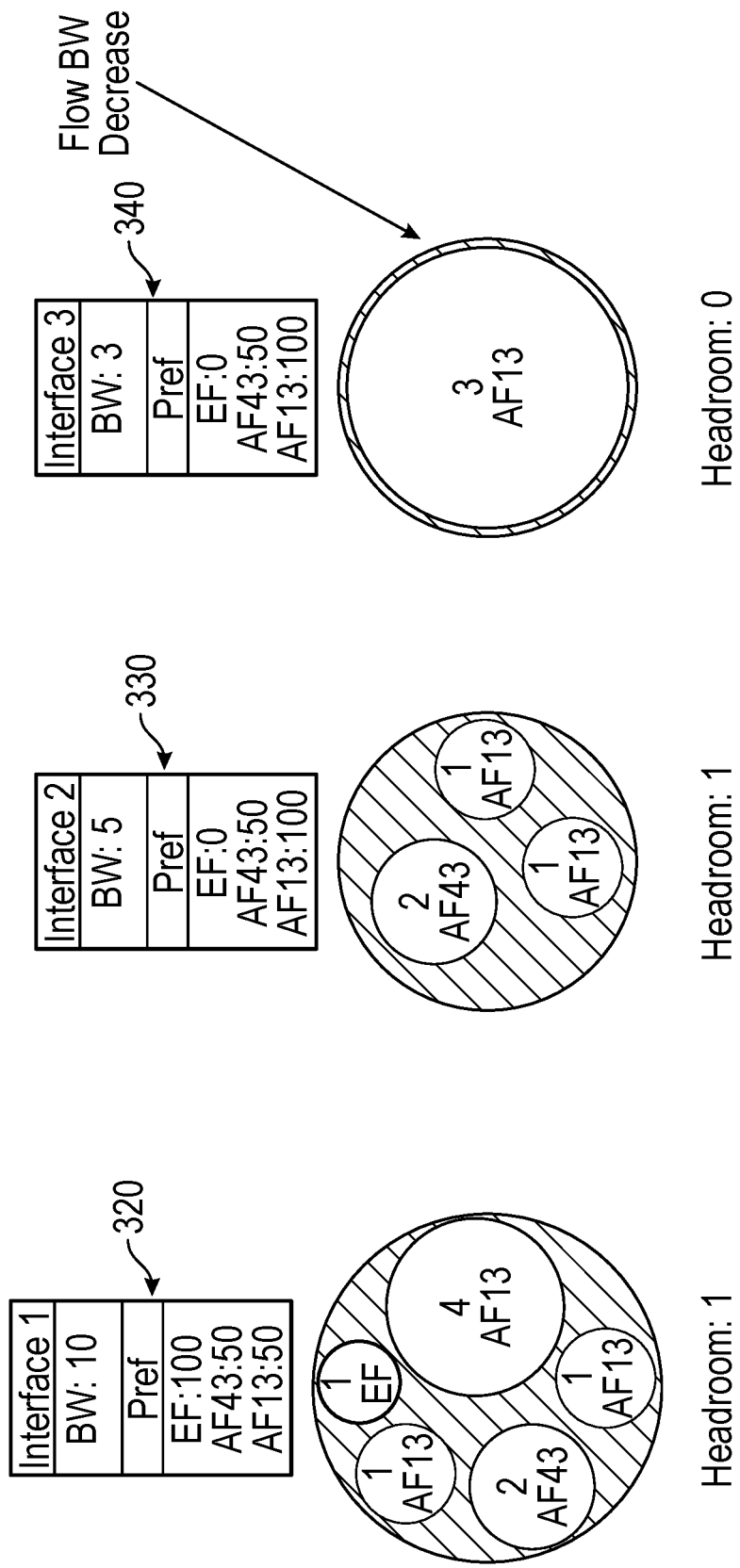
FIGS. 11a-c is an illustration of the operation of a flow redistribution process that operates when a flow bandwidth decrease event occurs.
Figure 11B:
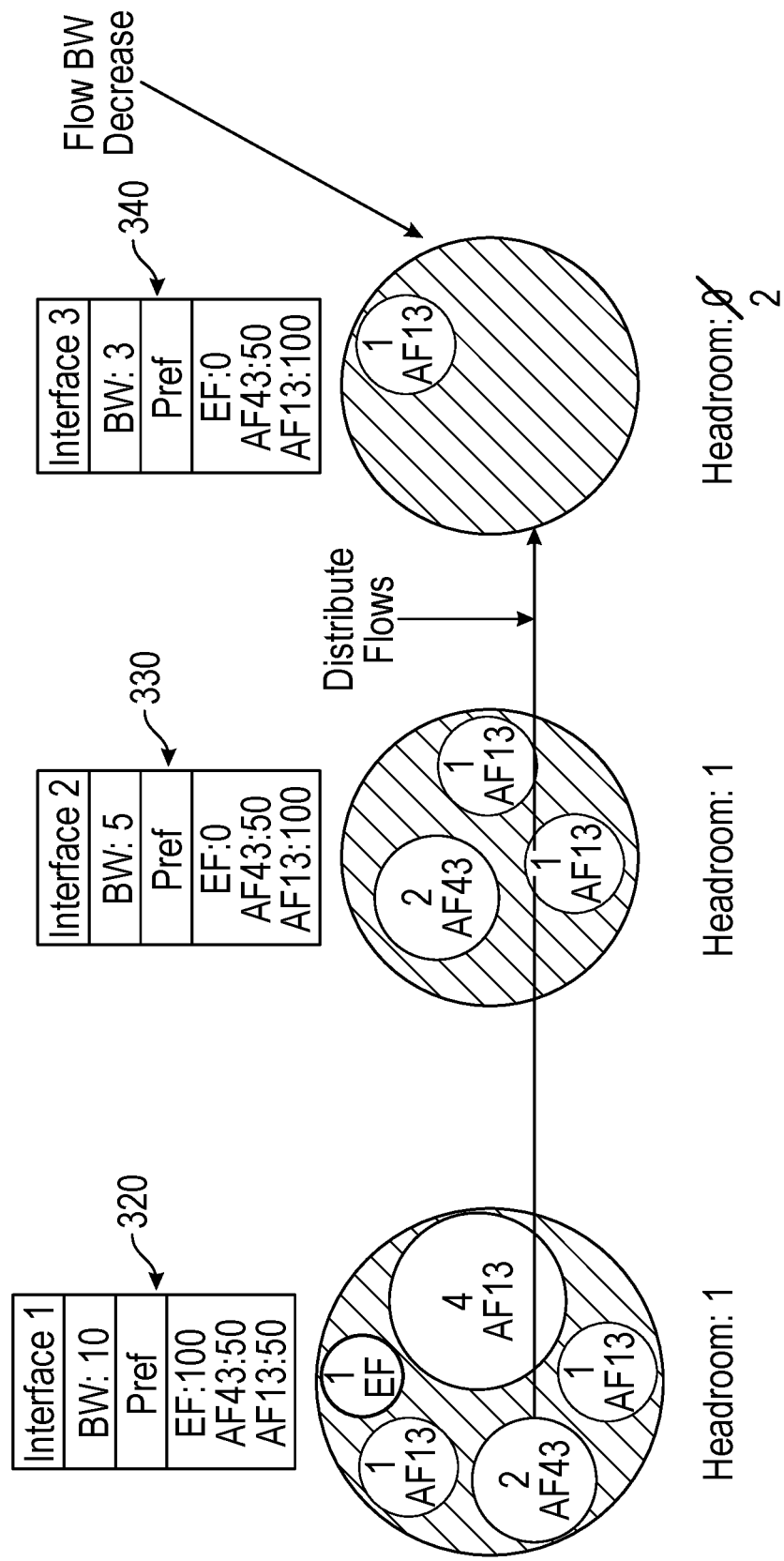
Figure 11C:
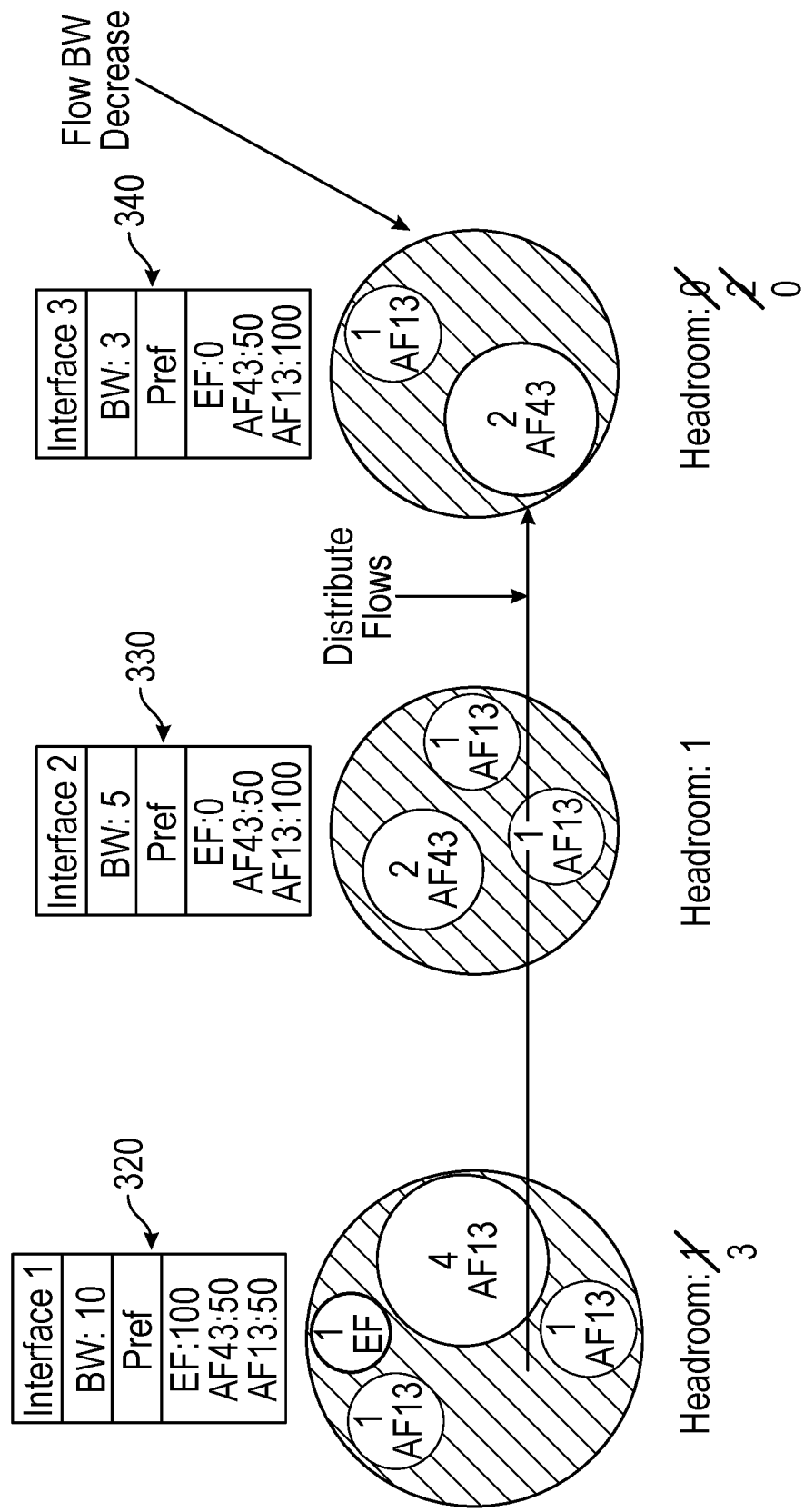

FIGS. 11*a*-*c* is an illustration of the operation of a flow redistribution process that operates when a flow bandwidth decrease event occurs. In FIG. 11*a*, the bandwidth of the flow in Interface 3 340 is 3 (3AF13). In FIG. 11*b*, the bandwidth of that flow decreases to 1 (1AF13), so the headroom of Interface 3 340 increases to 2. Therefore, the flows are redistributed, with flow 2AF43 moving from Interface 1 320 to Interface 3 340, with the final result shown in FIG. 11c.

Each of the methods described above may be performed by a processor or plurality of processors coupled to memory having instructions stored thereon for performing the methods. The processor may include, for example, a microprocessor, microcomputer, digital signal processor, or custom ASIC.

Any process descriptions or blocks in flow charts or flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved. In some embodiments, steps of processes identified in FIG. 1 using separate boxes can be combined. Further, the various steps in the flow diagrams illustrated in conjunction with the present disclosure are not limited to the architectures described above in association with the description for the flow diagram (as implemented in or by a particular module or logic) nor are the steps limited to the example embodiments described in the specification and associated with the figures of the present disclosure. In some embodiments, one or more steps may be added to the methods described in FIG. 1 either in the beginning, end, and/or as intervening steps, and that in some embodiments, fewer steps may be implemented.

It should be emphasized that the above-described embodiments of the present disclosure are merely possible examples of implementations, merely set forth for a clear understanding of the principles of the disclosed systems and methods. Many variations and modifications may be made to the above-described embodiment(s) without departing substantially from the spirit and principles of the disclosure. Although all such modifications and variations are intended to be included herein within the scope of this disclosure and protected by the following claims, the following claims are not necessarily limited to the particular embodiments set out in the description.

What is claimed is:

1. A method of assigning a flow to one of a plurality of interfaces, comprising:
    receiving, at a processor connected to a plurality of interfaces, a flow having a flow bandwidth;
    for each interface in the plurality of interfaces, determining, by the processor, a preference of the each interface for the flow; and
    assigning, by the processor, the flow to one interface of the plurality of interfaces based on the preference of the each interface for the flow, wherein assigning the flow to the one interface of the plurality of interfaces based on the preference of the each interface of the flow comprises:
        when only a single interface of the plurality of interfaces has the preference for the flow, assigning, by the processor, the flow to the single interface;
        when multiple interfaces of the plurality of interfaces having the preference for the flow have a comparable headroom, assigning, by the processor, the flow to the one interface of the multiple interfaces with a fewest flows currently assigned to it; and
        when the multiple interfaces of the plurality of interfaces having the preference for the flow do not have the comparable headroom, assigning, by the processor, the flow to the one interface within the multiple interfaces having the preference for the flow that has a greatest headroom.

2. The method of claim 1, further comprises determining, by the processor, a headroom for the each interface of the plurality of interfaces, wherein determining the headroom for the each interface of the plurality of interfaces comprises subtracting a sum of flow bandwidths of flows assigned to the each interface of the plurality of interfaces from a maximum bandwidth of the each interface.

3. The method of claim 1, further comprising, when a headroom of the one interface in the plurality of interfaces becomes negative, shrinking, by the processor, flow bandwidths of flows assigned to the one interface so that the headroom becomes greater than or equal to zero.

4. The method of claim 3, further comprising, after shrinking the flow bandwidths of the flows, for the flow:
    for the each interface of the plurality of interfaces, determining, by the processor, the preference of the each interface for the flow;
    when only the single interface has the preference for the flow, assigning, by the processor, the flow to the single interface;
    when the multiple interfaces having the preference for the flow have the comparable headroom, assigning, by the processor, the flow to the one interface of the multiple interfaces with the fewest flows currently assigned to it; and
    when the multiple interfaces having the preference for the flow do not have the comparable headroom, assigning, by the processor, the flow to the one interface within the multiple interfaces having the preference for the one interface that has the greatest headroom.

5. The method of claim 1, further comprising when a new interface comes up, searching, by the processor, through a plurality of flows assigned to the plurality of interfaces and moving at least one flow from at least one of the plurality of interfaces to the new interface based on the flow bandwidth of the at least one flow and a Differentiated Service Code Point (DSCP) value of the at least one flow.

6. The method of claim 5, further comprising moving, by the processor, the at least one flow in order to minimize a difference in a headroom between the plurality of interfaces and the new interface.

7. The method of claim 1, further comprising, when a first interface of the plurality of interfaces goes down, moving, by the processor, flows from the first interface that went down to other interfaces in the plurality of interfaces based on flow bandwidths of the flows and a Differentiated Service Code Point (DSCP) values of the flows.

8. The method of claim 1, further comprising, when a first interface of the plurality of interfaces has an increase in an available bandwidth, swapping, by the processor, a first flow from the first interface of the plurality of interfaces with a second flow in a second interface of the plurality of interfaces in order to minimize a difference in a headroom between the first interface of the plurality of interfaces and the interface second of the plurality of interfaces.

9. The method of claim 1, further comprising, when a first interface of the plurality of interfaces has a decrease in an available bandwidth, moving, by the processor, at least one flow from the first interface to a second interface of the plurality of interfaces based on a Differentiated Service Code Point (DSCP) value of the at least one flow.

10. The method of claim 1, further comprising, when a first interface of the plurality of interfaces has a decrease in an available bandwidth, shrinking, by the processor, the flow bandwidth of at least one flow within the first interface of the plurality of interfaces.

11. The method of claim 1, further comprising, when the flow bandwidth of the flow increases, redistributing, by the processor, the flow based on an increased flow bandwidth of the flow and a Differentiated Service Code Point (DSCP) value of the flow.

12. The method of claim 1, further comprising, when the flow bandwidth of the flow decreases, redistributing, by the processor, the flow based on a decreased flow bandwidth of the flow and a Differentiated Service Code Point (DSCP) value of the flow.

13. An apparatus comprising:
a memory; and
a processor coupled to the memory, the processor being configured to:
receive a flow having a flow bandwidth;
for each interface in a plurality of interfaces associated with the processor, determine a preference of the each interface for the flow; and
assign the flow to one interface of the plurality of interfaces based on the preference of the each interface for the flow, wherein the processor being operative to assign the flow to the one interface of the plurality of interfaces based on the preference of the each interface of the flow comprises the processor being operative to:
when only a single interface has the preference for the flow, assign the flow to the single interface;
when multiple interfaces having the preference for the flow have a comparable headroom, assign the flow to the one interface of the multiple interfaces with a fewest flows currently assigned to it; and
when the multiple interfaces having the preference for the flow do not have the comparable headroom, assign the flow to the one interface within the multiple interfaces having the preference for the flow that has a greatest headroom.

14. The apparatus of claim 13, wherein the processor is further configured to: when a headroom of the one interface in the plurality of interfaces becomes negative, shrink flow bandwidths of flows assigned to the one interface so that the headroom becomes greater than or equal to zero.

15. The apparatus of claim 14, wherein the processor is further configured to after shrinking the flow bandwidths of the flows, for each flow:
for the each interface in the plurality of interfaces, determine the preference of the each interface for the flow;
when only the single interface has the preference for the flow, assign the flow to the single interface;
when the multiple interfaces having the preference for the flow have the comparable headroom, assign the flow to the one interface of the multiple interfaces with the fewest flows currently assigned to it; and
when the multiple interfaces having the preference for the flow do not have the comparable headroom, assign the flow to the one interface within the multiple interfaces having the preference for the flow that has the greatest headroom.

16. The apparatus of claim 13, wherein the processor is further configured to: when a new interface comes up, search through a plurality of flows assigned to the plurality of interfaces and move at least one flow from at least one of the plurality of interfaces to the new interface based on the flow bandwidth of the at least one flow and a Differentiated Service Code Point (DSCP) value of the at least one flow.

17. The apparatus of claim 13, wherein the processor is further configured to: when the one interface of the plurality of interfaces goes down, move flows from the one interface that went down to other interfaces in the plurality of interfaces based on flow bandwidths of the flows and a Differentiated Service Code Point (DSCP) values of the flows.

18. The apparatus of claim 13, wherein the processor is further configured to: when a first interface of the plurality of interfaces has an increase in an available bandwidth, swap a first flow from the first interface of the plurality of interfaces with a second flow in a second interface of the plurality of interfaces in order to minimize a difference in a headroom between the first interface of the plurality of interfaces and the second interface of the plurality of interfaces.

19. The apparatus of claim 13, wherein the processor is further configured to: when a first interface of the plurality of interfaces has a decrease in an available bandwidth, move at least one flow from the first interface to a second interface of the plurality of interfaces based on a Differentiated Service Code Point (DSCP) value of the at least one flow.

20. A non-transitory computer-readable medium that stores a set of instructions which when executed by a processor perform a method comprising:
receiving, at the processor, a flow having a flow bandwidth;
determining a flow bandwidth and a Differentiated Service Code Point (DSCP) value of the flow;
determining, by the processor, that a plurality of interfaces with an available headroom are available to process the flow based on the flow bandwidth;
determining, by the processor for each interface in the plurality of interfaces, a preference for the flow based on the DSCP value of the flow; and
assigning, by the processor, the flow to a first interface of the plurality of interfaces based on the preference for the flow, wherein assigning the flow to the first interface of the plurality of interfaces based on the preference for the flow comprises:
assigning, by the processor in response to determining that only the first interface of the plurality of interfaces has the preference for the flow, the flow to the first interface;
assigning, by the processor in response to determining that multiple interfaces of the plurality of interfaces having the preference for the flow have a comparable headroom, the flow to the first interface of the multiple interfaces with a fewest flows currently assigned to it; and
assigning, by the processor in response to determining that the multiple interfaces of the plurality of interfaces having the preference for the flow do not have the comparable headroom, the flow to the first interface within the multiple interfaces that has a greatest headroom.

* * * * *